US011537361B2

(12) United States Patent
Vogel

(10) Patent No.: US 11,537,361 B2
(45) Date of Patent: Dec. 27, 2022

(54) PROCESSING UNIT, METHOD AND COMPUTER PROGRAM FOR MULTIPLYING AT LEAST TWO MULTIPLICANDS

(71) Applicant: Robert Bosch GmbH, Stuttgart (DE)

(72) Inventor: Sebastian Vogel, Schaidt (DE)

(73) Assignee: Robert Bosch GmbH, Stuttgart (DE)

( * ) Notice: Subject to any disclaimer, the term of this patent is extended or adjusted under 35 U.S.C. 154(b) by 164 days.

(21) Appl. No.: 17/051,429

(22) PCT Filed: May 21, 2019

(86) PCT No.: PCT/EP2019/063119
§ 371 (c)(1),
(2) Date: Oct. 28, 2020

(87) PCT Pub. No.: WO2019/242968
PCT Pub. Date: Dec. 26, 2019

(65) Prior Publication Data
US 2021/0224037 A1 Jul. 22, 2021

(30) Foreign Application Priority Data

Jun. 19, 2018 (DE) .......................... 102018209901.4

(51) Int. Cl.
*G06F 7/523* (2006.01)
*G06F 5/01* (2006.01)
(Continued)

(52) U.S. Cl.
CPC ................ *G06F 7/523* (2013.01); *G06F 5/01* (2013.01); *G06F 7/50* (2013.01); *G06F 7/5443* (2013.01); *G06F 7/552* (2013.01); *G06N 20/00* (2019.01)

(58) Field of Classification Search
CPC .......... G06F 7/523; G06F 7/5443; G06F 7/50; G06F 7/552; G06F 7/4833; G06F 7/4876; G06F 5/01; G06N 20/00
See application file for complete search history.

(56) References Cited

U.S. PATENT DOCUMENTS 4,555,768 A 11/1985 Lewis, Jr. et al.
2018/0046894 A1 2/2018 Yao

FOREIGN PATENT DOCUMENTS

DE 102013220432 A1 4/2015
EP 3242254 A1 11/2017
(Continued)

OTHER PUBLICATIONS

Li, Yuhang, et al. "Additive Powers-of-Two Quantization: An Efficient Non-Uniform Discretization for Neural Networks." ArXiv. org, Feb. 2, 2020, https://arxiv.org/abs/1909.13144. (Year: 2020).*
(Continued)

*Primary Examiner* — Matthew D Sandifer
*Assistant Examiner* — Huy Duong
(74) *Attorney, Agent, or Firm* — Norton Rose Fulbright US LLP; Gerard Messina

(57) ABSTRACT

A processing unit and a method for multiplying at least two multiplicands. The multiplicands are present in an exponential notation, that is, each multiplicand is assigned an exponent and a base. The processing unit is configured to carry out a multiplication of the multiplicands and includes at least one bitshift unit, the bitshift unit shifting a binary number a specified number of places, in particular, to the left; an arithmetic unit, which carries out an addition of two input variables and a subtraction of two input variables; and a storage device. A computer program, which is configured to
(Continued)

execute the method, and a machine-readable storage element, in which the computer program is stored, are also described.

18 Claims, 6 Drawing Sheets

(51) Int. Cl.
  *G06F 7/50* (2006.01)
  *G06F 7/544* (2006.01)
  *G06N 20/00* (2019.01)
  *G06F 7/552* (2006.01)

(56) References Cited

FOREIGN PATENT DOCUMENTS

| | | |
|---|---|---|
| JP | H05-40605 A | 2/1993 |
| JP | 2003-067182 A | 3/2003 |

OTHER PUBLICATIONS

M. Marchesi, N. Benvenuto, G. Orlandi, F. Piazza and A. Uncini, "Design of multi-layer neural networks with powers-of-two weights," 1990 IEEE International Symposium on Circuits and Systems (ISCAS), 1990, pp. 2951-2954 vol.4, doi: 10.1109/ISCAS.1990.112629. (Year: 1990).*

D. Patterson., Computer Organization and Design, The hardware/software interface, Fourth Edition, Elsevior 2008 (Year: 2008).*

Mathew, et al.: "Sparse, Quantized, Full Frame CNN for Low Power Embedded Devices", Proceedings of IEEE Conference on Computer Vision and Pattern Recognition Workshops, (2017), pp. 11-19.

Mody, et al.: "Low Cost and Power CNN/Deep Learning Solution for Automated Driving", 19th International Symposium on Quality Electroonic Design (ISQED), IEEE, (2018), pp. 432-436.

International Search Report for PCT/EP2019/063119, dated Aug. 13, 2019.

Gysel et al., "Hardware-Oriented Approximation of Convolutional Neural Networks," Cornell University, 2016, pp. 1-18. <https://arxiv.org/pdf/1604.03168>.

Mark G Arnold et al., "On the Cost Effectiveness of Logarithmic Arithmetic for Back Propagation Training on SIMD Processors," Proceedings of /CNN '97, 1997, pp. 933-936. <https://ieeexplore.ieee.org/ielx3/4831/13415/00616>.

Chuan Zhang Tang et al., "Multilayer Feedforward Neural Networks With Single Powers-of-Two Weights," IEEE Transactions on Signal Processing, vol. 41, No. 8, 1993, pp. 2724-2727.

\* cited by examiner

PROCESSING UNIT, METHOD AND COMPUTER PROGRAM FOR MULTIPLYING AT LEAST TWO MULTIPLICANDS

FIELD

The present invention relates to a processing unit for multiplying at least two multiplicands with the aid of bit-shifting. The present invention also relates to a method for multiplying at least two multiplicands with the aid of bit-shifting; a computer program, which is configured to execute the method; and a machine-readable storage element, in which the computer program is stored.

BACKGROUND INFORMATION

German Patent Application No. DE 10 2013 220 432 A1 describes a model computation unit for an integrated control module, which is provided with an exponential function, summing functions and multiplication functions in at least one inner and one outer loop, using pure hardware-based implementation, in order to calculate a data-based functional model, in particular, a Gaussian process model.

SUMMARY

In a first aspect, the present invention relates to a processing unit. In accordance with the present invention, the processing unit is configured to carry out a multiplication of at least two multiplicands. The multiplicands each have a first exponent and a first base. The multiplicands, in particular, the first bases, each have a second base and a second and a third exponent.

In accordance with an example embodiment of the present invention, the processing unit includes, inter alia, the following features:

At least one bitshift unit, which shifts a binary number a specified number of places, in particular, to the left. In addition, the processing unit includes an arithmetic unit, which carries out an addition of two input variables and a subtraction of two input variables; as well as a storage device. The storage device may be a register or a lookup table.

The arithmetic unit and the bitshift unit are interconnected in such a manner, that the arithmetic unit first carries out a subtraction of the third exponents.

The arithmetic unit and the bitshift unit of the processing unit are also interconnected, so that the bitshift unit carries out a first shift of a binary number of one of the first exponents of the multiplicands by a number of places of a value of the subtracted exponents, which means that the arithmetic unit carries out an addition of the result of the first shift to the further, first exponent of the multiplicands.

The result of the addition is split up into an integer part and a fractional part as a function of a value of the smaller exponent of the third exponents.

The splitting-up into the integer part and the fractional part may be accomplished by shifting the result of the addition by the number of places of the value of the smaller exponent of the third exponents, since during this shifting, the radix point of the result of the addition, which determines the division into the respective parts, is shifted.

A binary number of the fractional part is then fetched out of the storage device.

The binary number of the fractional part is preferably a binary number of the fractional part raised to a higher power, in particular, a binary number of a power of the ascertained fractional part, with a base of 2.

The bitshift unit subsequently carries out a second shift of the binary number of the fractional part by the number of places of the value of the integer part.

The fractional part may be used as an address for reading out of the storage device.

A fractional part is understood to be a part of a number, which comes after the decimal point or binary point. Therefore, the integer part is the part of the number that is correspondingly in front of the decimal point. Alternatively, the integer part may be understood as a whole number of the part of the number correspondingly in front of the decimal point.

The processing unit has the advantage that the multiplication is carried out by shifting binary numbers of the exponents of the multiplicands, and that the shifting of binary numbers may be executed by hardware in a particularly resource-efficient and energy-efficient manner. In addition, the processing unit may be implemented on a smaller chip surface, since a complex, hardware-implemented multiplication unit (e.g., a floating-point multiplier or a fixed-point multiplier) may be dispensed with. Furthermore, the processing unit is more energy-efficient, since the operations necessary for shifting the binary numbers during the execution of the multiplication consume less energy than a complex multiplication unit. Therefore, the processing unit is particularly economical with the resources, such as energy, computing time and chip area, which are needed for executing the multiplication.

In the first aspect of the present invention, the shifting may also be executed, in each instance, bit-by-bit.

In addition, in the first aspect of the present invention, the bitshift unit may carry out the first shift by filling in the right side of the exponent, which corresponds to the greater of the third exponents, with a plurality of "O's," in particular, as a function of a value of the subtraction of the third exponents. The plurality of "O's" each represent the binary value "0" in an advantageous manner. In the following, this action is referred to as a bit adjustment.

The advantage of this is that in the case of different resolution of the first exponents (that is, different fixed-point representation), whose binary representations may be matched to each other, e.g., the subsequent addition of the binary numbers may be executed directly.

In addition, it may be provided that the storage device have at least $2^n$ entries, where n is equal to the magnitude of the smaller exponent of the three exponents. In each instance, an entry, which corresponds to a result of the fractional part raised to a higher power, is preferably stored in the storage device for each of all of the different possible values, which the lesser exponent of the third exponents may have. The fractional part may be used as an address for fetching the respective binary number out of the storage device.

The advantage of this is that by accessing the storage device, the binary number of the fractional part raised to a higher power is ascertained, which means that exponential calculations that are computationally highly time-intensive do not have to be carried out by hardware.

Furthermore, the processing unit may include an accumulation unit, which accumulates results of a plurality of multiplications of, in each instance, at least two multiplicands.

The advantage of this is that, e.g., matrix vector multiplications or convolutions, which occur, inter alia, during operation of a machine learning system, and for the calculation of which multiplications followed by additions are executed, may be carried out in a particularly resource-conserving manner, for the results of the specific instances of multiplication do not have to be individually stored temporarily and subsequently summed up, but may be accumulated directly.

A conversion unit, in particular, a priority encoder, may be provided, which converts the result of the multiplication to an exponential notation. In the exponential notation, a number is represented with the aid of a first exponent and a first base. The first base may have a predefined value. On the other hand, in the exponential notation, it is also possible for the number to have a second base and a second and third exponent.

The conversion to the exponential notation is advantageous, since the result is present in a format suitable for being able to supply the result to the processing unit as a multiplicand again.

In a second aspect of the present invention, a method for multiplying at least two multiplicands in a processing unit is provided. In accordance with an example embodiment of the present invention, the multiplicands each have a first exponent and a first base. The multiplicands, in particular, the first bases, each have a second base and a second and a third exponent.

The method includes, inter alia, the following steps:

Initially, the first exponents of the multiplicands and the third exponents are provided. Each of the provided exponents is quantized, in particular, a binary number.

The third exponents are subsequently subtracted from each other. After that, a first shift of a binary number of one of the first exponents of the multiplicands, by a number of places of a value of the subtracted exponents, is carried out. Afterwards, the result of the first shift is added to the further, first exponent of the multiplicands. The result of the addition is split up into an integer part and a fractional part as a function of a value of the smaller exponent of the third exponents.

This splitting-up may also be accomplished by shifting the result of the addition by a number of places as a function of the value of the smaller exponent of the third exponents.

Subsequently, a second shift of a binary number of the fractional part by the number of places of the value of the integer part is carried out.

The individual steps are preferably executed with the aid of a processor or an arithmetic unit (arithmetic logic unit, ALU) of the processing unit. In an advantageous manner, at least the first shift is carried out by a bitshift unit or with the aid of a bit adjustment, and the second shift is carried out by the bitshift unit.

The advantage of the second aspect of the present invention is that with the aid of this method, multiplications may be executed in the processing unit in a resource-friendly manner.

In addition, it is provided that in each instance, the shifting be carried out bit-by-bit.

In the second aspect of the present invention, the binary number of the fractional part may be fetched out of a storage device, in particular, out of a register or a lookup table. For this, the fractional part may be used as an address of the storage device for fetching out the binary number of the fractional part.

Furthermore, the result of the second shift may be broken down into an exponent and a specifiable base, in particular, into the exponential notation.

This allows the result to be reused easily for repeated multiplication by the method according to the second aspect of the present invention. A further advantage is that with the aid of the exponential notation, the result takes up less storage space, since the exponents may be quantized more markedly than the result, as such. Due to this, a reduction in the required storage space may also be achieved during the execution of the method.

It is advantageous if the second bases and the second exponents each have a value of two, since the power of two allows simple reconstruction from a given exponent and base of the multiplicand. In addition, the power of two has a high hardware affinity, which means that the method may be reproduced by hardware in a particularly simple manner, in particular, using bit-shifting.

In addition, it is proposed that the supplied exponents be represented by a maximum of 10 bits. This results in a marked reduction in memory and in a marked reduction in the required memory bandwidth, as well.

An advantage of this is that a significant reduction in storage space may be attained, for the multiplicands normally stored, using at least 32 bits, may be stored, in each instance, using only 10 bits per exponent, without a significant loss of accuracy in the result of the multiplication. This leads to a marked reduction in the memory usage for storing the individual multiplicands.

In one further aspect of the present invention, a method for operating a machine learning system is put forward. In accordance with an example embodiment of the present invention, a plurality of parameters and state variables of the machine learning system, which are normally used as multiplicands during the operation of the machine learning system, are each stored, in particular, in a further storage device. Multiplications of these multiplicands are executed according to one of the methods of the second aspect of the present invention.

In a machine learning system, the parameters and the state variables may be multiplied by each other. A state variable is understood as an ascertained intermediate result of the machine learning system. The intermediate result may be ascertained as a function of a plurality of the parameters of the machine learning system, and as a function of an input variable and/or of a previous, ascertained intermediate result. The intermediate result may often be processed further with the aid of the machine learning system, until the machine learning system has ascertained an output variable as a function of the intermediate result.

Since, in a machine learning system, a basic computational operation is multiplication and this is carried out very often during the operation of the machine learning system, a significant increase in the computational performance efficiency and computing speed of the processing unit may be achieved by the method according to the second aspect of the present invention, which means that the machine learning system becomes more powerful, as well.

A plurality of the results of the multiplications may be accumulated, in particular, with the aid of an accumulator, for besides the multiplications, additions are often carried out during the operation of the machine learning system, which means that using the accumulation of the results, the additions and, consequently, the calculations of the machine learning system may be carried out in the processing unit in a particularly computationally efficient and time-efficient manner. This allows the efficiency of the machine learning system to be increased, as well.

In the further aspect of the present invention, during training of the machine learning system, at least the bases of the exponential notation of the state variables and the parameters may be ascertained.

The advantage is that suitable bases of the multiplicands are already ascertained during the training, which means that during the training, the machine learning system may take into account the exponential notation while ascertaining the parameters of the machine learning system.

Training of the machine learning system is understood to mean that the with the aid of supplied training data, the machine learning system learns to solve a specifiable problem, for example, to classify or segment an input variable, such as a recorded image.

Alternatively, after the training of the machine learning system, at least the bases for the exponential notation of the state variables and the parameters of the machine learning system may be ascertained.

The advantage is that retraining, using the converted parameters, does not have to be carried out, since a value of the first bases may be selected as desired. For machine learning systems, it has been shown to be particularly advantageous, when the first bases of at least the parameters of the machine learning system have a value less than 2, through which retraining does not have to be carried out.

In addition, the bases may be ascertained as a function of a propagated quantization error. The propagated quantization error characterizes a difference of the result of the multiplication of two multiplicands, using quantized exponents, from a result of the multiplication of these two multiplicands, using, preferably, real exponents, or using exponents quantized in a highly resolved manner, for example, 32-bit quantized exponents.

If a number is present in the exponential notation and the exponent is quantized, then, hereinafter, this is referred to as a quantized exponential notation. The advantage of the propagated quantization error is that only input training data, which have not been provided with labels and attributes, are needed.

Alternatively, the propagated quantization error may characterize a difference of a result with and without quantization of a(n) (in)directly subsequent multiplication. In this connection, a multiplicand of a directly subsequent multiplication is the result of multiplying the multiplicands in quantized exponential notation; an at least first base of one of the multiplicands being ascertained in the exponential notation.

In this connection, a multiplicand of an indirectly subsequent multiplication is a function of the result of multiplying the multiplicands in quantized exponential notation; a first base of one of the multiplicands being ascertained in the exponential notation.

In particular, the (in)directly subsequent multiplication is likewise carried out, using quantized or real exponents.

If the machine learning system includes a deep neural network, then the propagated quantization error may characterize a difference of a state variable and a(n) (in)directly subsequent layer of the deep neural network. In this connection, the state variable is a function of at least the multiplicand, whose first base is ascertained.

In addition, the exponents may be ascertained as a function of the ascertained base of the exponential notation, and these ascertained exponents may be quantized, in particular, converted to a binary number. In the quantization of the exponents, that is, the conversion of the exponents to a binary number, beginning with an initial resolution of the exponents, using 10 bits, the resolution is reduced step-by-step, in each instance, by one bit, if a variable characterizing a quantization error is less than a specifiable quantity. It should be noted that the initial resolution may be selected arbitrarily to be between at least 5 bits and more than 30 bits.

For machine learning systems, it has turned out to be advantageous to begin with 10 bits, since in this case, speedy discovery of an optimum resolution is achieved, without already obtaining an inaccurate exponent at the start.

In one further aspect of the present invention, the input variable of the machine learning system is a variable, which has been measured with the aid of a sensor. A controlled variable may be ascertained as a function of an output variable of the machine learning system.

The controlled variable may be used for controlling an actuator of a technical system. The technical system may be, for example, an at least semiautonomous machine, an at least semiautonomous vehicle, a robot, a tool, a factory machine or a flying object, such as a drone. For example, a movement of the robot or vehicle may be controlled, or the actuator may be controlled, with the aid of the controlled variable.

The input variable may be ascertained in an alternative manner, e.g., as a function of acquired sensor data, and supplied to the machine learning system. The sensor data may be acquired by a sensor, such as a camera, of the technical system, or may be received from the outside.

In one further aspect of the present invention, a computer program is provided. The computer program is configured to implement one of the above-mentioned methods. The computer program includes instructions, which cause a computer to execute one of these above-mentioned methods having all of its steps, when the computer program runs on the computer. Additionally provided, is a machine-readable storage module, in which the computer program is stored.

In one further aspect of the present invention, a product is provided, which is obtainable by executing one of the methods of the second aspect that includes at least the training of the machine learning system.

Exemplary embodiments of the aspects mentioned above are represented in the figures and explained in greater detail in the description below.

DETAILED DESCRIPTION OF EXAMPLE EMBODIMENTS

Figure 1:
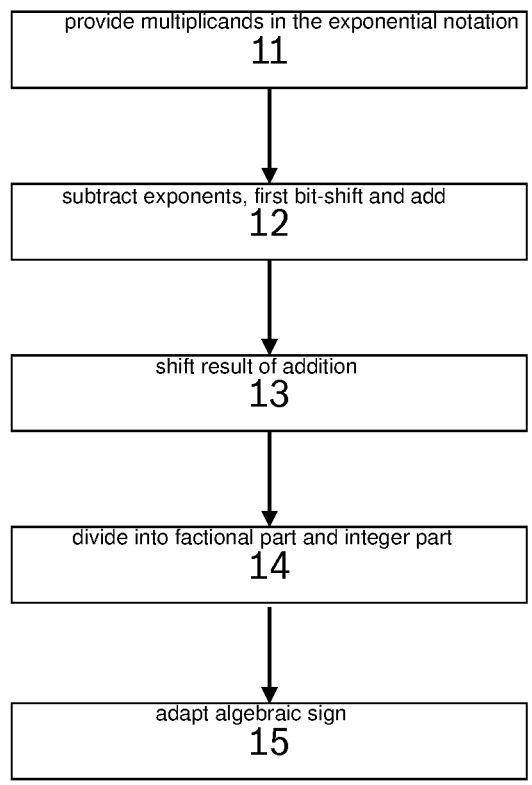
FIG. 1 shows a schematic representation of a method for ascertaining a multiplication of two multiplicands with the aid of bit-shifting, in accordance with an example embodiment of the present invention.

FIG. 1 shows a schematic representation of a method 10 for multiplying two multiplicands, in accordance with an example embodiment of the present invention. The method utilizes, inter alia, the mathematical property that multiplication of a multiplicand a by a further multiplicand b in the binary system may be carried out, using bit-shifting (bit-shift), if b may be represented by an exponential notation, in this case, as a power of two, $b=2^{\hat{b}}$.

The multiplication may be ascertained, using bit-shifting of a binary number of multiplicands a to the left by $\hat{b}$ places:

$$a \cdot b = a << \hat{b} \quad (1)$$

The operator << denotes a bitshift of multiplicand a to the left in the binary system by the number of places of value $\hat{b}$.

For the case in which multiplicand a may also be represented by a power of two, $a=2^{\hat{a}}$, then:

$$a \cdot b = 1 << (\hat{a} + \hat{b}) \quad (2)$$

It is noted that the conversion of multiplicands a and b to the exponential notation has the result that, in order to store these values, only the exponent $\hat{a}$, $\hat{b}$ must be stored; the exponent being able to be stored, using fewer bits than original multiplicand a, b. Multiplicands a, b are preferably stored, using 32 bits, whereas exponents $\hat{a}$, $\hat{b}$ are preferably stored, using 8 or even fewer bits. It should be noted that, in addition, the information regarding the base, which has been selected for the exponential notation, must be known. This means that marked quantization of the exponent may be selected, through which storage space is reduced. Furthermore, it is noted that the multiplication according to one of the above-mentioned equations (1), (2) is independent of a hardware numeral representation format, e.g., fixed-point, since the multiplication is carried out in the binary system.

For general bases B having the condition $B \neq 2$, any number c may be determined in an exponential notation:

$$c = B^{\hat{c}} \quad (3)$$

using an exponent $\hat{c}$, which is preferably quantized.

In addition, in the following, the bases B are selected as follows, so that they satisfy the equation:

$$ld(B) = 2^z \quad (4)$$

where z comes from the set of integers $z \in \mathbb{Z}$ and preferably has a negative value.

For the given quantized exponent $\hat{c}$ of base B and given exponent z of base 2, a reconstruction of value c with given $\hat{c}$, z is calculated as follows:

$$c = B^{\hat{c}} = 2^{ld(B)\hat{c}} = 2^{2^z \hat{c}} = 2^{\hat{c} << z} = 1 << (\hat{c} << z) \quad (5)$$

For the case in which $z<0$, bit-shifting to the right takes place, and a binary number, which has z radix places, is formed in the exponent.

In addition, equation (5) may be simplified:

$$c = 2^{\hat{c} \ll z} = 2^{Integer\{\hat{c} \ll z\} + Fractional\{\hat{c} \ll z\}} \quad (6)$$
$$= 2^{Fractional\{\hat{c} \ll z\}} 2^{Integer\{\hat{c} \ll z\}}$$
$$= 2^{Fractional\{\hat{c} \ll z\}} \ll Integer\{\hat{c} \ll z\}$$

It should be pointed out that the fractional part may be derived directly from the number $\hat{c}$, since the fractional part includes z places, as just mentioned.

Equation (6) is preferably carried out exclusively by hardware. Then, it is possible for the value $2^{Fractional\{\hat{c}<<z\}}$ to be stored in a lookup table (LUT).

The LUT contains $2^z$ entries, so that all of the necessary values for the expression $2^{Fractional\{\hat{c}<<z\}}$ are stored.

Consequently, the number c may be reconstructed efficiently, using a bit-shift of the number fetched out of the LUT to the left by the number of places of the value of the expression Integer$\{\hat{c}<<z\}$. It is noted that the value fetched out of the LUT is also quantized, preferably, using a quantization resolution between 5 and 30 bits.

The method 10 according to FIG. 1 begins with step 11. In step 11, multiplicands c, d are provided in the exponential notation. In this context, the providing includes that exponents $\hat{c}$, $\hat{d}$ of multiplicands c, d and at least bases $B_c$, $B_d$ of these multiplicands c, d are provided. Preferably, bases $B_c$, $B_d$ are already supplied in the exponential notation, as well. Alternatively, the supplied bases $B_c$, $B_d$ may be converted to the exponential notation as a function of a specifiable base. The specifiable base advantageously has a value of 2, see equation (4).

In the exponential notation, the multiplication may take place as follows:

$$cd = B_c^{\hat{c}} B_d^{\hat{d}} = 2^{ld(B_c)\hat{c} + ld(B_d)\hat{d}} \quad (7)$$

Now, if $B_m = \min(B_c, B_d)$, then $B_m = 2^{z_b}$ and $z_b = \min(z_c, z_d)$; this means that the following is true for $z_c < z_d$:

$$cd = 2^{ld(B_c)\hat{c} + ld(B_d)\hat{d}} = 2^{2^{z_b}(\hat{c} + 2^{z_d - z_c}\hat{d})} \quad (8)$$

Since, in this example, $z_d - z_c > 0$, the addition of the exponents by hardware may take place with the aid of a bit adjustment, that is, by filling in binary zeros on the right side with respect to a bit-shift, as a function of the difference $z_d - z_c$.

If $z_c < z_d$, then the multiplication by $2^{z_b}$ corresponds to a shift to the right, and the result of the addition in parentheses in equation (8) is shifted to the right, which means that the number of radix places in the exponent is determined by $\|z_b\|$.

Equation (8) may be simplified as follows:

$$cd = 2^{2^{z_b}(\hat{c} + 2^{z_d - z_c}\hat{d})} = 2^{(\hat{c} + (\hat{d} \ll (z_d - z_c))) \ll z_b} := 2^{\hat{p}} \quad (9)$$

After step 11 is completed, step 12 follows. In this, a subtraction of the exponents $(z_d - z_c)$ is carried out, as shown in the second line of equation (9).

Subsequently, in step 12, a first bit-shift of one of the exponents $\hat{d}$ by the number of places of the value of the result of the subtraction $(z_d - z_c)$ is carried out. Preferably, the first bit-shift may be carried out by hardware in the form of a bit adjustment, as mentioned with regard to equation (8). The result of the first bit-shift is then added to further exponent $\hat{c}$.

In the following step 13, using a second shift, the result of the addition is shifted (in particular, to the right) by the number of places of the value of $z_b$. The result of this is now $\hat{p}$. In this context, it should be pointed out that for the case of $z_b < 0$, the second shift results in $\|z_b\|$ radix places in $\hat{p}$.

Step 14 follows step 13. In this, the ascertained result $\hat{p}$ from step 13 is split up into a fractional and an integer part, as in equation (6). As an alternative, step 13 may be skipped, and in step 14, the result of the addition from step 12 is divided up directly into a fractional and an integer part as a function of the value $z_b$.

The final result of the multiplication for $c \cdot d = p$ is then given as:

$$c \cdot d = 2^{Fractional\{\hat{p}\}} << Integer\{\hat{p}\} \quad (10)$$

This means that in step 14, the value of the fractional part is shifted by the number of places of the value of the integer part.

The value of the term $2^{Fractional\{\hat{p}\}}$ is preferably stored in an LUT, and the value is fetched out of the LUT, in order to ascertain the result c·d. This LUT includes $2^{\|z_b\|}$ entries, so that for each possible value of Fractional$\{\hat{p}\}$, a corresponding value $2^{Fractional\{\hat{p}\}}$ is stored. The entries of the LUT may initially be ascertained and stored at the start of method 10.

It should be pointed out that the method may also be executed, using more than two multiplicands (a, b, c, ... ). For this, the LUT contains $2^{\|min\ (z_a, z_b, z_c)\|}$ entries. When using the method with more than two multiplicands, the equations above must be suitably expanded by adding the exponents of the further multiplicands. It is also possible for the multiplicands to be described, using more than one exponent. This may be taken into account in the above-mentioned equations, as well.

It is noted that method 10 may also be implemented, using at least one negative multiplicand. If one or the two multiplicands have a negative algebraic sign, then, in one further specific embodiment, method 10 may be executed up to and including step 14, while disregarding the algebraic sign of the multiplicands. In this specific embodiment, step 15 is then executed after step 14 has been finished. In step 15, the algebraic sign of the result of the multiplication of p=c·d is adapted in accordance with the algebraic signs of the respective multiplicands c, d. If, for example, a multiplicand is negative, then the result of the multiplication becomes negative, as well. If the two multiplicands are negative, then the result of the multiplication is positive.

With that, method 10 ends. It is possible for the method to be implemented by hardware or software or a mixture of software and hardware.

Figure 2:
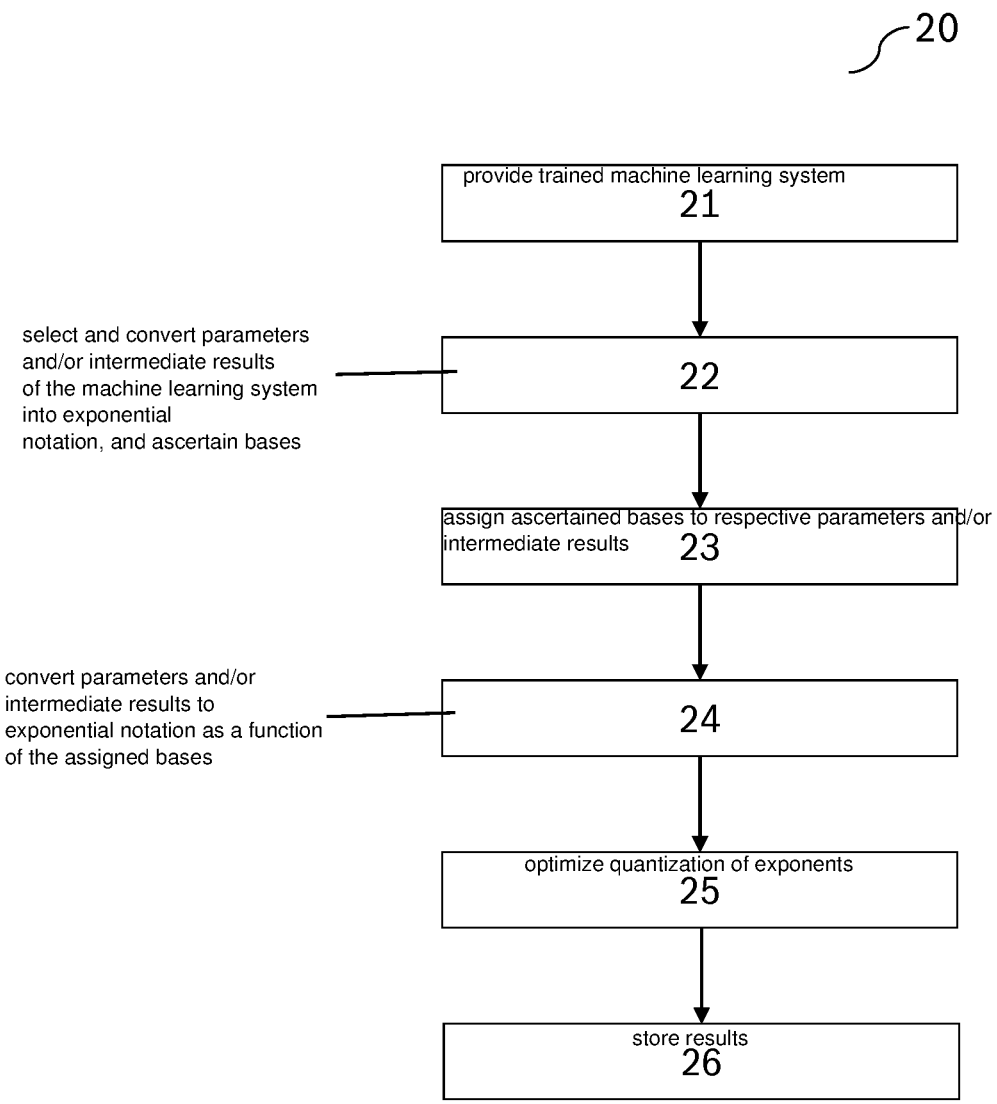
FIG. 2 shows a schematic representation of a method for ascertaining bases of the multiplicands for a machine learning system, in accordance with an example embodiment of the present invention.

FIG. 2 shows a schematic representation of a method 20 for ascertaining the bases $B_c$, $B_d$ of the exponential notation of the multiplicands for a machine learning system, in accordance with an example embodiment of the present invention. In this specific embodiment, the machine learning system includes a deep neural network.

The method 20 begins with step 21. In this, a trained machine learning system is provided. This means that a parameterization of the machine learning system was already determined during the training. The machine learning system may be trained with the aid of an optimization method, in particular, a gradient descent method, using supplied training data. Alternatively, the machine learning system may be trained in step 21.

In subsequent step 22, the parameters and, additionally or alternatively, intermediate results, of the machine learning system are selected, which are converted to the exponential notation. Equations (cf. equations (13) and (14) below), which are optimized, are then set up for these parameters and/or intermediate results. The result of the optimization then yields the bases, which are suitable for an adequate depiction of the parameters and/or intermediate results in the exponential notation.

If the machine learning system includes, by way of example, a neural network, the parameters, in particular, intermediate results, may be converted, in layers, to the exponential notation. Preferably, the parameters and/or intermediate results of the respective layers may each be represented with the aid of the same base. It is preferable for the constraint, that the bases have a value less than 2, to be considered during the determination of the bases.

In addition, the exponents of the parameters and of the intermediate results of the machine learning system may be quantized in the exponential notation.

For the intermediate results $y^{(l)}$ of layer (l) in the quantized exponential notation $\hat{y}^{(l)}$, the following applies:

$$y^{(l)} \approx B_y^{(l)} \hat{y}^{(l)} =: \tilde{y}^{(l)} \tag{11}$$

The relationship shown in equation (11) is also valid for the representation of the parameters of the machine learning system, in particular, for the parameters, which are multiplied by other values, such as the intermediate results.

The determination of the base $B_y$, $B_w$ is carried out as a function of the quantization error $q = y^{(l)} - \tilde{y}^{(l)}$.

Alternatively, a propagated quantization error may be used, in order to ascertain base $B_y$, $B_w$. The propagated quantization error characterizes a difference between the result of the multiplication with and without quantization, or a difference between a further multiplication, in the case of which this result is reused as a multiplicand for the further multiplication.

The propagated quantization error $q_p$ is given by the following equation:

$$q_p = \Sigma w^{(l+1)} x^{(l+1)} - \Sigma w^{(l+1)} \tilde{x}^{(l+1)} \tag{12}$$

In this connection, output variables $y^{(l)}$ of layer (l) of the machine learning system, in particular, of the neural network, are written as input variables x of layer (l+1). In addition, or as an alternative, the (l+n)th layer may also be used for ascertaining the quantization error. The training data used for training the machine learning system may be used as an input variable of the machine learning system.

The optimal selection of $B_y$, $B_w$ for the propagated quantization error is given by:

$$B_y^{(l)} = \underset{B_y^{(l)}}{\arg\min} \left( \left\| \sum w^{(l+1)} x^{(l+1)} - \sum w^{(l+1)} \tilde{x}^{(l+1)} \right\|_2 \right) \tag{13}$$

$$B_w^{(l)} = \underset{B_w^{(l)}}{\arg\min} \left( \left\| \sum w^{(l)} x^{(l)} - \sum \tilde{w}^{(l)} x^{(l)} \right\|_2 \right) \tag{14}$$

After equations (13), (14) are set up, they are subsequently solved in step 22, in order to ascertain the specific bases.

Equations (13) and (14) may be minimized, using combinatory testing of different values of the bases, or as an alternative, using a gradient descent method.

After the end of step 22, step 23 may be executed. In step 23, the ascertained bases are assigned to the respective parameters and/or intermediate results.

In subsequent step 24, the parameters and/or intermediate results may be converted to the exponential notation as a function of the assigned bases.

It is preferable for step 25 to be executed subsequently. In this, the quantization of exponents $\hat{c}$, $\hat{d}$, $z_c$, $z_d$ is optimized.

The selection of the bit width of quantization of the exponents may be carried out iteratively. Preferably, the exponent is quantized initially, using 8 bits, maximally, using 10 bits, and optionally, using more than 10 bits, as well. Consequently, in each instance, one bit fewer is used step-by-step, as long as the machine learning system delivers results of sufficient quality, compared to, e.g., the forecast quality of the machine learning system, using the initial quantization.

In step 26, the parameters and/or intermediate results in the exponential notation are optionally stored in a storage device. The bases and the exponents are stored for this.

Alternatively, the bases may be stored in the exponential notation, as well. The base two is preferably used in the exponential notation of these bases.

It should be noted that the steps of ascertaining the bases for the intermediate results and parameters may also be carried out during the training of the machine learning system. This may be accomplished with the aid of so-called shadow weights. For this, see the paragraph "fine-tuning" on page 3 in P. Gysel et al., "Hardware-oriented Approximation of Convolutional Neural Networks," 2016, arxiv.org, [Online] https://arxiv.org/pdf/1604.03168.pdf.

The method 20 concludes at step 26.

Figure 3:
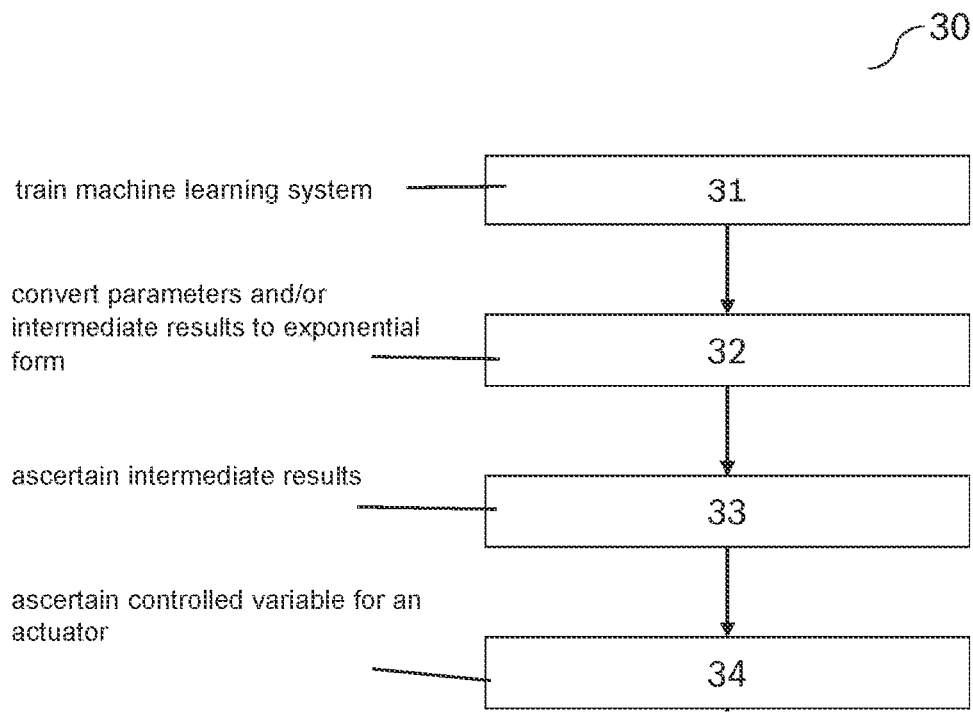
FIG. 3 shows a schematic representation of a method for operating the machine learning system, in accordance with an example embodiment of the present invention.

FIG. 3 shows a schematic representation of a method 30 for operating a machine learning system, advantageously, on a calculating machine, such as a computer, in accordance with an example embodiment of the present invention.

The method 30 begins with step 31. In this step, the machine learning system is trained. Optionally, step 31 may be executed several times, one after the other.

After the machine learning system is trained, step 32 is executed. In this, a plurality of parameters and/or intermediate results of the machine learning system are converted to the exponential notation. For this, the bases may initially be ascertained, e.g., according to method 20 in FIG. 2. The exponents are then determined as a function of the ascertained bases.

After step 32 is completed, step 33 follows. In step 33, the machine learning system ascertains intermediate results as a function of its parameters and a supplied input variable. The intermediate results, which are ascertained by multiplying at least two multiplicands, are ascertained according to the method 10 from FIG. 1. The multiplications may occur, for example, due to matrix multiplications or folding operations. In addition, the results of the individual multiplications, in particular, of the matrix multiplication or of the folding operation, which have been carried out with the aid of method 10, may be accumulated.

Optionally, one result of the subtraction of exponents $z_d - z_c$ may be stored per layer of the machine learning system. This has the advantageous effect that the calculation of the subtraction may be carried out by rapidly supplying the respective result.

In subsequent step 34, a controlled variable for an actuator of a technical system may be ascertained as a function of an output variable of the machine learning system.

Figure 4:
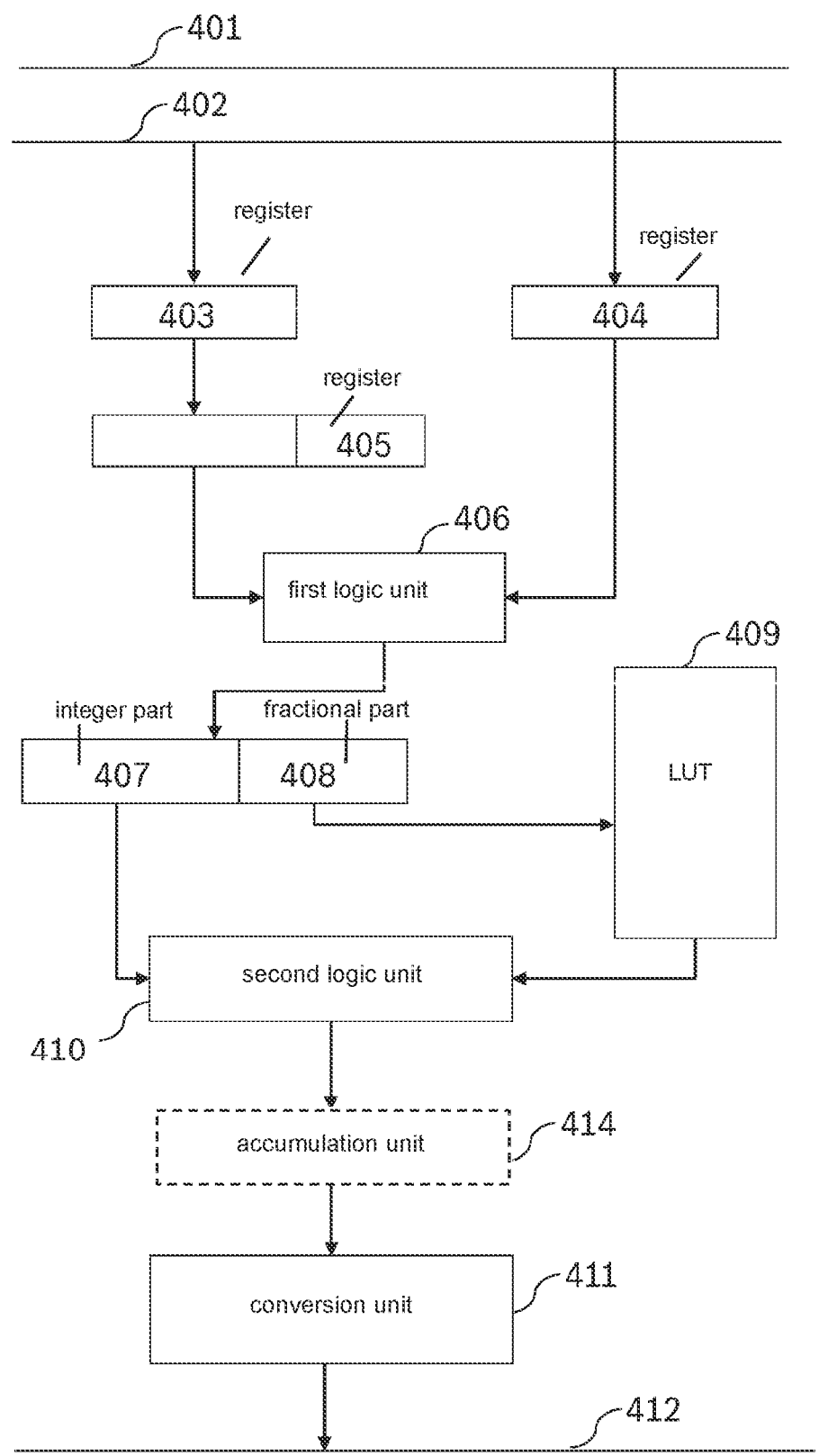
FIG. 4 shows a schematic representation of a specific embodiment of a processing unit for ascertaining a multiplication of two multiplicands with the aid of bit-shifting, in accordance with an example embodiment of the present invention.

FIG. 4 shows a schematic representation of a processing unit, which is configured to execute a multiplication with the aid of bit-shifting, in accordance with an example embodiment of the present invention.

A first and a second data line 401, 402 may each be connected to a register 403, 404 of the processing unit. Multiplicands c, d are loaded into these registers 403, 404. The multiplicands of this specific embodiment are the quantized exponents, preferably, binary exponents.

The first multiplicand undergoes a bit-shift to the left. With this, the bit adjustment is carried out as a function of the subtraction $z_d - z_c$ (see equations (8) and (9)), in a manner that is efficient with regard to hardware resources. Optionally, the width of the bit-shift or, more precisely, of the register, is adjustable, preferably, in each instance, for the layers of the machine learning system. According to FIG. 4, this bit-shifting may be carried out by filling up 405 a register with zeroes on the right side. Each of the zeroes correctly represents the binary value of "0."

Subsequently, exponent $\hat{p}$ from equation (9) is calculated in a first logic unit 406. For this, first logic unit 406 includes at least one adder (advantageously, an ALU), which carries out the addition of the specific exponents according to equation (9), and at least one bit-shift unit, which shifts the result of the addition as a function of the smallest exponent $z_b$. It should be pointed out that exponents $z_c$, $z_d$ may be supplied, e.g., with the aid of further data lines of logic unit 406. In this connection, the result of first logic unit 406 corresponds to the $\hat{p}$ according to equation (9).

The result of logic unit 406 is subsequently split up into an integer part 407 and into a fractional part 408. Fractional part 408 is preferably ascertained as a function of the smallest exponent $z_b$, which indicates the number of radix places.

In a further exemplary embodiment, in particular, when the smallest exponent $z_b$ has a negative value, first logic unit 406 only includes the adder. The result of the addition is subsequently split up into an integer part 407 and into a fractional part 408, using a fictitious shift of the radix point as a function of the smallest exponent $z_b$. The fictitious shifting of the radix point allows the shifting of the result of the addition by the bitshift unit to be omitted.

Fractional part 408 is subsequently used as an address of LUT 409. A stored value of the LUT for the given address is subsequently transmitted to a second logic unit 410.

Besides the value of the LUT, second logic unit 410 additionally obtains integer part 407 of the result of first logic unit 406. Second logic unit 410 carries out a bit-shift of the value of the LUT by the number of places of the value of integer part 407. For this, logic unit 410 advantageously includes a further bitshift unit or alternatively uses the bitshift unit of logic unit 406.

Since the result from second logic unit 410 is not outputted in the exponential notation, a conversion unit 411 may be configured to convert its input variable to the quantized exponential notation. The output of conversion unit 411 may be connected to a third data line 412. The bit width of third data line 412 may be adjusted to the bit width of the quantized exponent, which means that the effective bandwidth is increased. Conversion unit 411 is preferably a priority encoder.

Optionally, an accumulation unit 414 may be interconnected between second logic unit 410 and conversion unit 411 of the processing unit. In the case of repeated, serial execution of multiplications, the accumulation unit 414 is configured to accumulate the results of the multiplication in the accumulation unit. This result of the accumulation unit 414 may then be used to determine an activation, in particular, the activation of a neuron. It is noted that the ascertained instances of activation may also be results of folding operations. This means that with the aid of the accumulation unit 414, in addition to matrix multiplications, the processing unit may also ascertain folds, as occur, e.g., in folding neural networks (convolutional neural networks). In embodiments, the accumulation unit may be implemented by an adder tree.

In one further exemplary embodiment, the processing unit may be used for supporting the operation of a machine learning system. Now, this processing unit may be connected to a calculating machine, on which, e.g., the machine learning system is operated. Multiplications, which must be carried out on the calculating machine during the operation of the machine learning system, may then be transferred to the processing unit.

Figure 5:
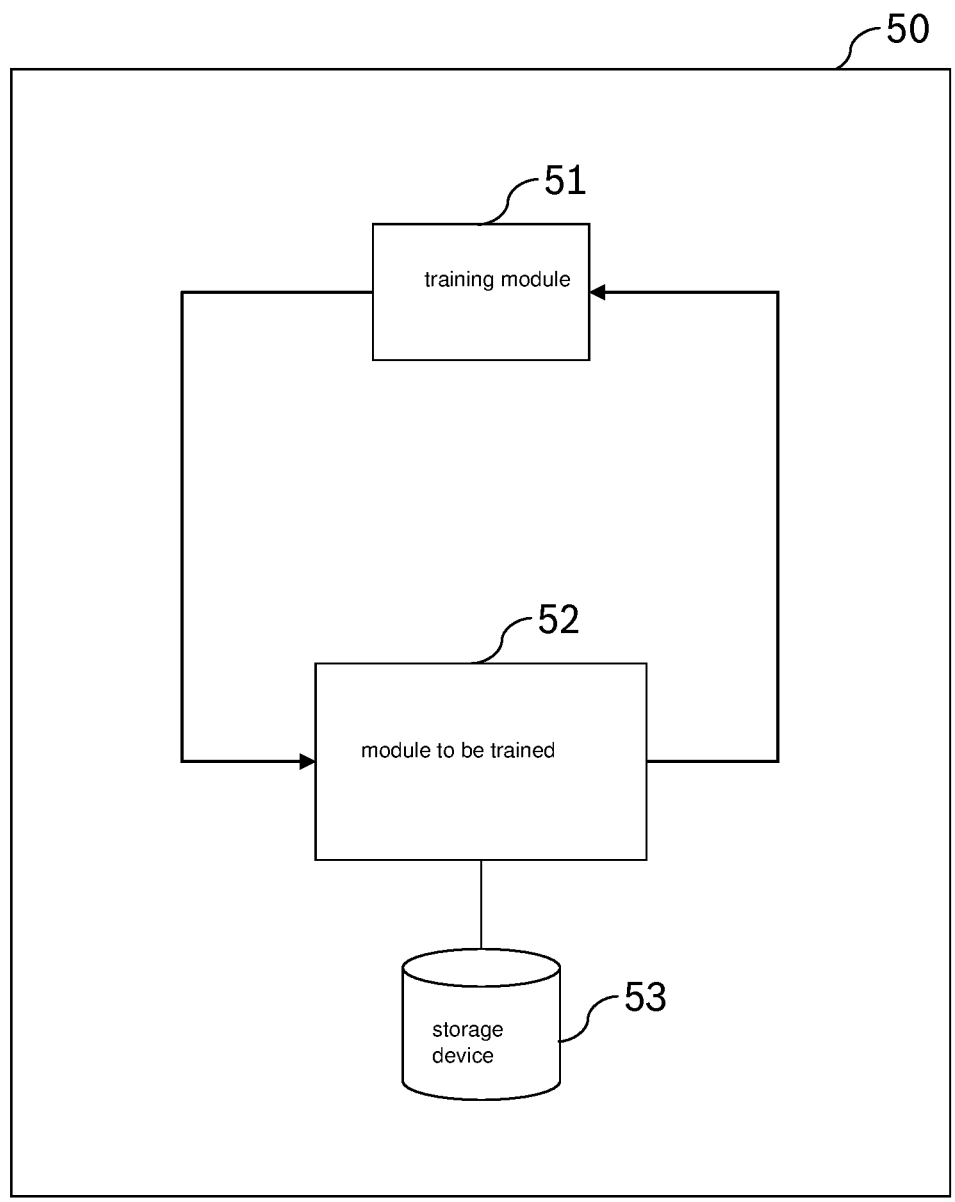
FIG. 5 shows a schematic representation of a specific embodiment of a device, which may be used for training the machine learning system, in accordance with an example embodiment of the present invention.

FIG. 5 shows a schematic representation of a device 50 for training the machine learning system, in particular, for executing the steps for training the machine learning system, e.g., step 31 of method 30, in accordance with an example embodiment of the present invention. The device 50 includes a training module 51 and a module 52 to be trained. This module 52 to be trained contains the machine learning system. Device 50 for training the machine learning system trains the machine learning system as a function of output variables of the machine learning system and, preferably, using specifiable training data. The training data advantageously include a plurality of recorded images, which are each labeled. During the training, parameters of the machine learning system, which are stored in a storage device 53, are adapted.

Figure 6:
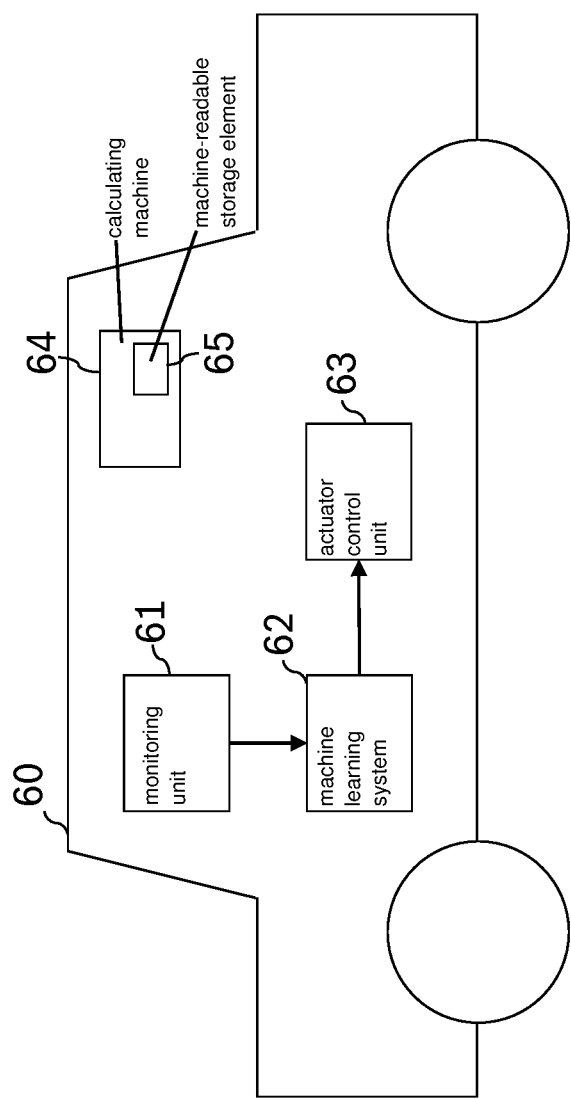
FIG. 6 shows a schematic representation of a specific embodiment of a semiautonomous vehicle, which includes the machine learning system, in accordance with an example embodiment of the present invention.

FIG. 6 shows a schematic representation of an at least semiautonomous vehicle 60, in accordance with an example embodiment of the present invention. In a further exemplary embodiment, the at least semiautonomous vehicle 60 may be a service, assembly or stationary production robot, or alternatively, an autonomous flying object, such as a drone. The at least semiautonomous vehicle 60 may include a monitoring unit 61. Monitoring unit 61 may be, for example, a camera, which monitors a surrounding area of vehicle 60. Monitoring unit 61 may be connected to a machine learning system 62. Machine learning system 62 ascertains an output variable as a function of a supplied input variable, e.g., provided by monitoring unit 61, and as a function of a plurality of parameters of machine learning system 62. The output variable may be forwarded to an actuator control unit 63. Actuator control unit 63 controls an actuator as a function of the output variable of machine learning system 62. Preferably, it controls the actuator in such a manner, that vehicle 60 performs a collision-free maneuver. In this exemplary embodiment, the actuator may be a motor or a brake system of vehicle 60.

In addition, vehicle 60 includes calculating machine 64 and a machine-readable storage element 65. A computer program, which includes commands that, upon execution of the commands on calculating machine 64, lead to calculating machine 64 carrying out one of the above-mentioned methods 10, 20, 30, may be stored in storage element 65. It is also possible for a download product or an artificially generated signal, which may each include the computer program, to cause calculating machine 64 to execute one of these methods after being received at a receiver of vehicle 60.

In an alternative exemplary embodiment, machine learning system 62 may be used for a building control system. A user behavior is monitored with the aid of a sensor, such as a camera or a motion detector, and the actuator control unit controls, for example, a heat pump of a heating installation as a function of the output variable of machine learning system 62. Machine learning system 62 may be configured to ascertain, as a function of a measured sensor variable, an operating mode of the building control system, which is desired on the basis of this user behavior.

In a further exemplary embodiment, actuator control unit 63 includes a release system. The release system decides if an object, such as a detected robot or a detected person, has access to a region, as a function of the output variable of machine learning system 62. The actuator, for example, a door opening mechanism, is preferably controlled with the aid of actuator control unit 63. In addition, the actuator control unit 63 of the previous exemplary embodiment of the building control system may include this release system.

In one alternative exemplary embodiment, vehicle 60 may be a tool or a factory machine or a manufacturing robot. A material of a workpiece may be classified with the aid of machine learning system 62. In this connection, the actuator may be, e.g., a motor, which drives a grinding wheel.

In one further specific embodiment of the present invention, machine learning system 62 is used in a measuring system, which is not shown in the figures. The measuring system differs from the vehicle 60 according to FIG. 1, in that the measuring system does not include an actuator control unit 63. Instead of transmitting the output variable of machine learning system 62 to actuator control unit 63, the measuring system may store it, for example, for later reuse, or, in addition or as an alternative, show it, for example, with the aid of visual displays or auditory indicators.

In a further development of the measuring system, it is also possible for monitoring unit 61 to record an image of a human or animal body or a portion of it. For example, this may be accomplished with the aid of an optical signal, with the aid of an ultrasonic signal, or using an MRT/CT method. In this further development, the measuring system may include machine learning system 62, which is trained to output a classification as a function of the input; the classification being, e.g., which clinical picture is possibly present on the basis of this input variable.

What is claimed is:

1. A processing unit, which is configured to carry out a multiplication of at least two multiplicands, the multiplicands each having a first exponent and a first base, each of the first bases having a second base, a second exponent, and a third exponent, the processing unit comprising:
   at least one bitshift unit, the at least one bitshift unit configured to shift a binary number a specified number of places to the left;
   an arithmetic unit; and
   a storage device;
   wherein:
      the arithmetic unit is configured to carrying out a subtraction of the third exponents,
      the at least one bitshift unit is configured to carry out a first shift of a binary number of the first exponent of one of the multiplicands by a number of places of a value of the subtracted third exponents, wherein the at least one bitshift unit carries out the first shift by filling in a plurality of zeros on the right side of a register of the at least one bitshift unit as a function of the value of the subtraction of the third exponents;
      the arithmetic unit configured to carry out an addition of a result of the first shift of the first exponent of the one of the multiplicands,
      a result of the addition being split up into an integer part and a fractional part as a function of a value of a smaller exponent of the third exponents,
      a binary number of the fractional part being fetched out of the storage device, wherein the fractional part is used as an address for fetching the binary value of the fractional part out of the storage device, and
      the at least one bitshift unit configured to carry out a second shift of the binary number of the fractional part by a number of places of a value of the integer part.

2. The processing unit as recited in claim 1, wherein the storage device has at least $2^n$ entries, n is equal to a magnitude of the smaller exponent of the third exponents.

3. The processing unit as recited in claim 1, wherein the processing unit also includes an accumulation unit, which accumulates results of a plurality of the multiplications of, in each instance, at least two multiplicands.

4. The processing unit as recited in claim 3, wherein the accumulation unit is implemented by an adder tree.

5. The processing unit as recited in claim 1, further comprising:

a conversion unit, the conversion unit being a priority encoder, the conversion unit configured to convert a result of the second shift to an exponential notation.

6. A method for multiplying at least two multiplicands in a processing unit, the processing unit including at least one bitshift unit, an arithmetic unit, and a storage device, the multiplicands each having a first exponent and a first base, each of the first bases having a second base, a second exponent, and a third exponent, the method comprising the following steps:
providing the first exponents of the multiplicands and the third exponents, each of the provided first exponents and the third exponents being quantized;
subtracting, by the arithmetic unit, the third exponents;
first shifting of a binary number of the first exponents of one of the multiplicands by a number of places of a value of the subtracted third exponents, wherein the first shifting is carried out by the at least one bitshift unit filling in a plurality of zeros on the right side of a register of the at least one bitshift unit as a function of the value of the subtraction of the third exponents;
adding, by the arithmetic unit, a result of the first shifting to the first exponent of the one of the multiplicands;
splitting up a result of the addition into an integer part and a fractional part as a function of a smaller exponent of the third exponents;
fetching a binary number of the fractional part out of the storage device, wherein the fractional part is used as an address for fetching the binary value of the fractional part out of the storage device; and
second shifting of the binary number of the fractional part by a number of places of a value of the integer part by the at least one bitshift unit.

7. The method as recited in claim 6, wherein the storage device includes a lookup table.

8. The method as recited in claim 6, wherein a result of the second shift is broken down into an exponent and a specifiable base.

9. The method as recited in claim 6, wherein each of the second bases has a value of two, and each of the second exponents has a value of two.

10. The method as recited in 6, wherein the provided first exponents and third exponents are each represented by a maximum of 10 bits.

11. A method for operating a machine learning system, in each instance, a plurality of parameters of the machine learning system and intermediate variables of the machine learning system being stored as multiplicands in a storage device, using an exponential notation, each of the stored multiplicands having a first exponent and a first base, each of the first bases having a second base, a second exponent, and a third exponent, multiplications of at least two of the stored multiplicands being carried out by a processing unit, the processing unit including at least one bitshift unit, an arithmetic unit, and a storage device, performing the following steps:
providing the first exponents of the at least two multiplicands and the third exponents of the first bases of the at least two of the multiplicands, each of the provided first exponents and the third exponents being quantized;
subtracting, by the arithmetic unit, the third exponents of the first bases of the at least two of the multiplicands;
first shifting of a binary number of the first exponents of one of the at least two multiplicands by a number of places of a value of the subtracted third exponents, wherein the first shifting is carried out by the at least one bitshift unit filling in a plurality of zeros on the right side of a register of the at least one bitshift unit as a function of the value of the subtraction of the third exponents;
adding, by the arithmetic unit, a result of the first shifting to the first exponent of the one of the at least two multiplicands;
splitting up a result of the addition into an integer part and a fractional part as a function of a smaller exponent of the third exponents of the first bases of the at least two of the multiplicands;
fetching a binary number of the fractional part out of the storage device, wherein the fractional part is used as an address for fetching the binary value of the fractional part out of the storage device; and
second shifting of the binary number of the fractional part by a number of places of a value of the integer part by the at least one bitshift unit.

12. The method as recited in claim 11, wherein during training of the machine learning system, at least the first and second bases of the exponential notation of the intermediate variables of the machine learning system and of the parameters of the machine learning system are ascertained.

13. The method as recited in claim 11, wherein after training of the machine learning system, at least the first and second bases for the exponential notation of the intermediate variables and of the parameters of the machine learning system are ascertained.

14. The method as recited in claim 11, wherein before or after training of the machine learning system, at least the first and second bases for the exponential notation of the intermediate variables and of the parameters of the machine learning system are ascertained, and wherein the first and second bases are ascertained as a function of a propagated quantization error, the propagated quantization error characterizing a difference of the result of the multiplication of two multiplicands, using quantized exponents, and a result of the multiplication of the two multiplicands, using real exponents.

15. The method as recited in claim 14, wherein the first, second and third exponents are ascertained as a function of the ascertained base of the exponential notation, and the ascertained exponents are quantized, and during the quantization of the exponents, beginning with a resolution of a quantization of the exponents, using 10 bits, the resolution is reduced step-by-step, in each instance, by one bit, when a variable characterizing a quantization error is less than a specifiable quantity.

16. The method as recited in claim 11, wherein an input variable of the machine learning system is a variable, which is measured using a sensor, and a controlled variable is ascertained as a function of an output variable of the machine learning system.

17. A non-transitory machine-readable storage element on which is stored a computer program for multiplying at least two multiplicands in a processing unit, the processing unit including at least one bitshift unit, an arithmetic unit, and a storage device, the multiplicands each having a first exponent and a first base, each of the first bases having a second base, a second exponent, and a third exponent, the computer program, when executed by a computer, causing the computer to perform the following steps:
providing the first exponents of the multiplicands and the third exponents, each of the provided first exponents and the third exponents being quantized;
subtracting, by the arithmetic unit, the third exponents;

first shifting of a binary number of the first exponents of one of the multiplicands by a number of places of a value of the subtracted third exponents, wherein the first shifting is carried out by the at least one bitshift unit filling in a plurality of zeros on the right side of a register of the at least one bitshift unit as a function of the value of the subtraction of the third exponents;

adding, by the arithmetic unit, a result of the first shifting to the first exponent of the one of the multiplicands;

splitting up a result of the addition into an integer part and a fractional part as a function of a smaller exponent of the third exponents;

fetching a binary number of the fractional part out of the storage device, wherein the fractional part is used as an address for fetching the binary value of the fractional part out of the storage device; and second shifting of the binary number of the fractional part by a number of places of a value of the integer part by the at least one bitshift unit.

18. A non-transitory machine-readable storage element on which is stored a computer program for operating a machine learning system, in each instance, a plurality of parameters of the machine learning system and intermediate variables of the machine learning system being stored as multiplicands in a storage device, using an exponential notation, each of the stored multiplicands having a first exponent and a first base, each of the first bases having a second base, a second exponent, and a third exponent, the computer program, when executed by a computer, the computer including at least one bitshift unit, an arithmetic unit, and a storage device, causing the computer to perform multiplications of at least two of the stored multiplicands by performing the following steps:

providing the first exponents of the at least two multiplicands and the third exponents of the first bases of the at least two of the multiplicands, each of the provided first exponents and the third exponents being quantized;

subtracting, by the arithmetic unit, the third exponents of the first bases of the at least two of the multiplicands;

first shifting of a binary number of the first exponents of one of the at least two multiplicands by a number of places of a value of the subtracted third exponents, wherein the first shifting is carried out by the at least one bitshift unit filling in a plurality of zeros on the right side of a register of the at least one bitshift unit as a function of the value of the subtraction of the third exponents;

adding, by the arithmetic unit, a result of the first shifting to the first exponent of the one of the at least two multiplicands;

splitting up a result of the addition into an integer part and a fractional part as a function of a smaller exponent of the third exponents of the first bases of the at least two of the multiplicands;

fetching a binary number of the fractional part out of the storage device, wherein the fractional part is used as an address for fetching the binary value of the fractional part out of the storage device; and second shifting of the binary number of the fractional part by a number of places of a value of the integer part by the at least one bitshift unit.

* * * * *